(12) United States Patent
Chen

(10) Patent No.: US 6,524,069 B2
(45) Date of Patent: *Feb. 25, 2003

(54) PROPELLER ASSEMBLY INCORPORATING IMPROVED LOCKING STRUCTURE

(75) Inventor: Liheng Chen, Schaumburg, IL (US)

(73) Assignee: Turning Point Propellers, Inc., Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/853,990

(22) Filed: May 11, 2001

(65) Prior Publication Data

US 2002/0009367 A1 Jan. 24, 2002

Related U.S. Application Data

(63) Continuation-in-part of application No. 09/612,441, filed on Jul. 7, 2000.

(51) Int. Cl.[7] ................................................ B63H 1/20
(52) U.S. Cl. .......................... 416/134 R; 416/245 A; 464/182; 440/83
(58) Field of Search .................... 416/93 A, 134 R, 416/245 A, 244 R; 464/182, 89; 440/49, 83

(56) References Cited

U.S. PATENT DOCUMENTS

| | | | | |
|---|---|---|---|---|
| 5,022,875 A | * | 6/1991 | Karls | 403/320 |
| 5,252,028 A | * | 10/1993 | LoBosco et al. | 416/134 R |
| 5,967,751 A | * | 10/1999 | Chen | 416/134 R |
| 6,358,008 B1 | * | 3/2002 | Chen | 416/134 R |

* cited by examiner

Primary Examiner—Edward K. Look
Assistant Examiner—Richard A. Edgar
(74) Attorney, Agent, or Firm—Boyle Fredrickson Newholm Stein & Gratz S.C.

(57) ABSTRACT

A propeller housing for a marine vehicle is provided which incorporates an improved locking structure for maintaining the propeller assembly on the drive shaft of the marine vehicle. The locking structure includes a spider washer having first and second ends and an aperture therebetween for receiving the propeller shaft therethrough. The spacer element includes a nose portion adjacent the first end thereof. A locking washer has an opening for receiving the nose portion of the spacer element therethrough and an outer periphery which maintains a propeller assembly on the propeller shaft. A locking element is mountable on the threaded end of the propeller shaft for retaining the spider washer thereon.

18 Claims, 4 Drawing Sheets

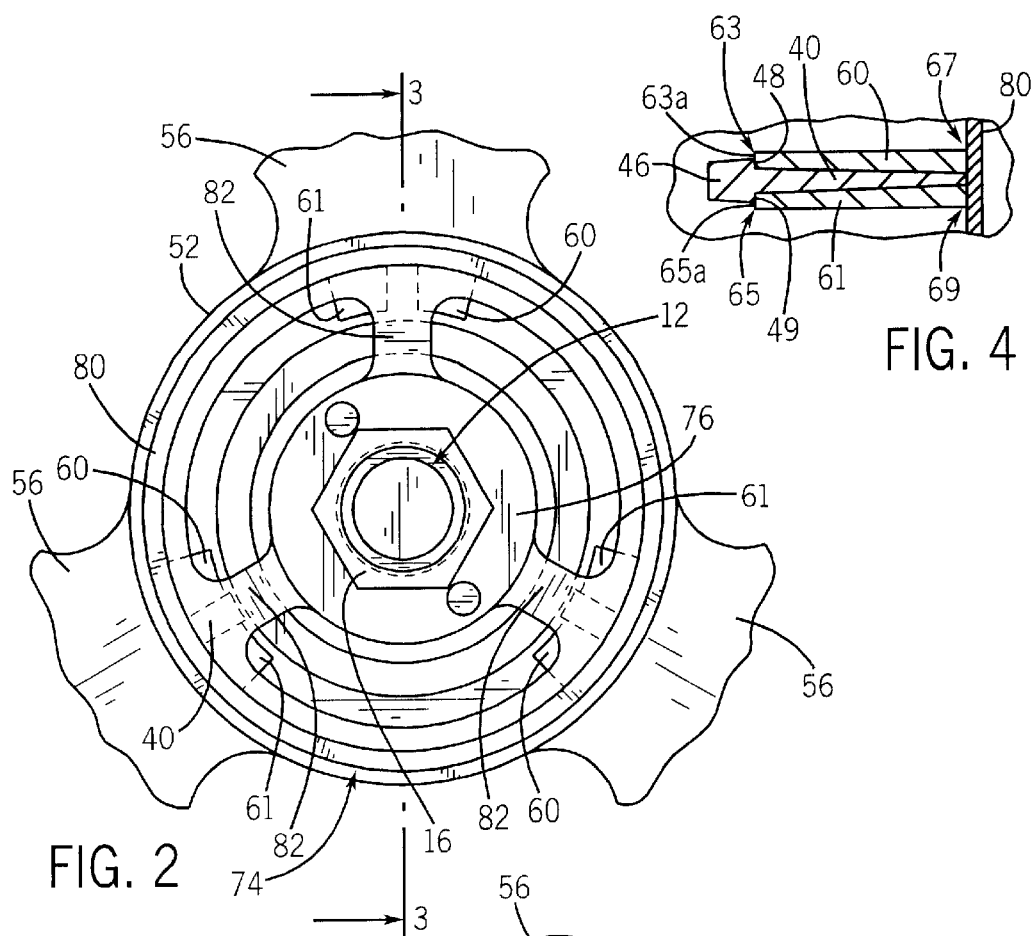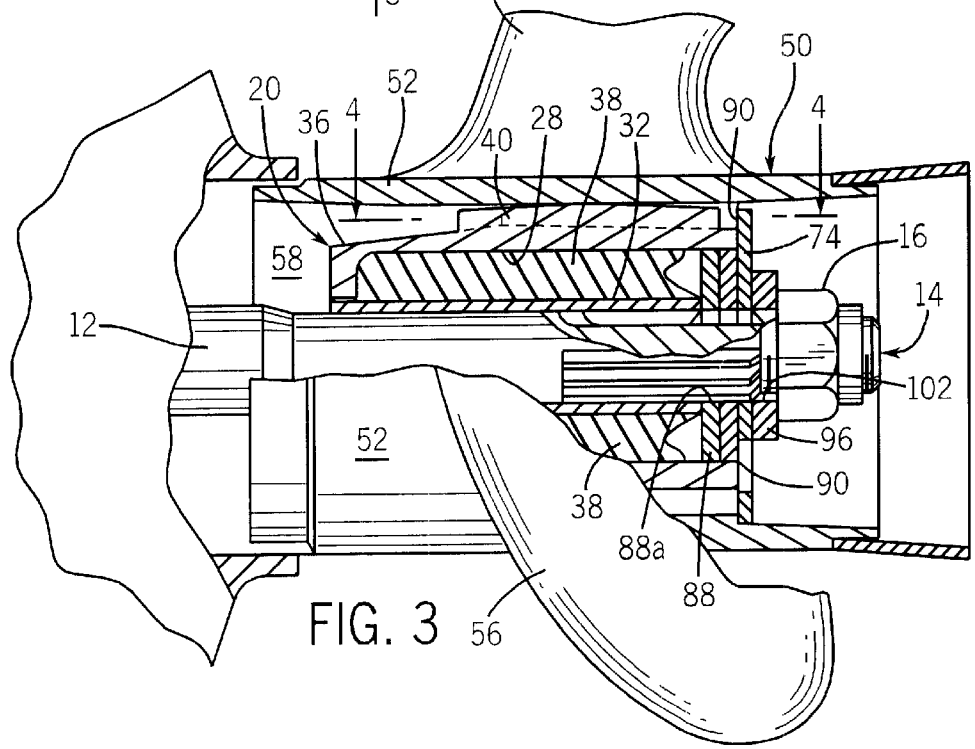

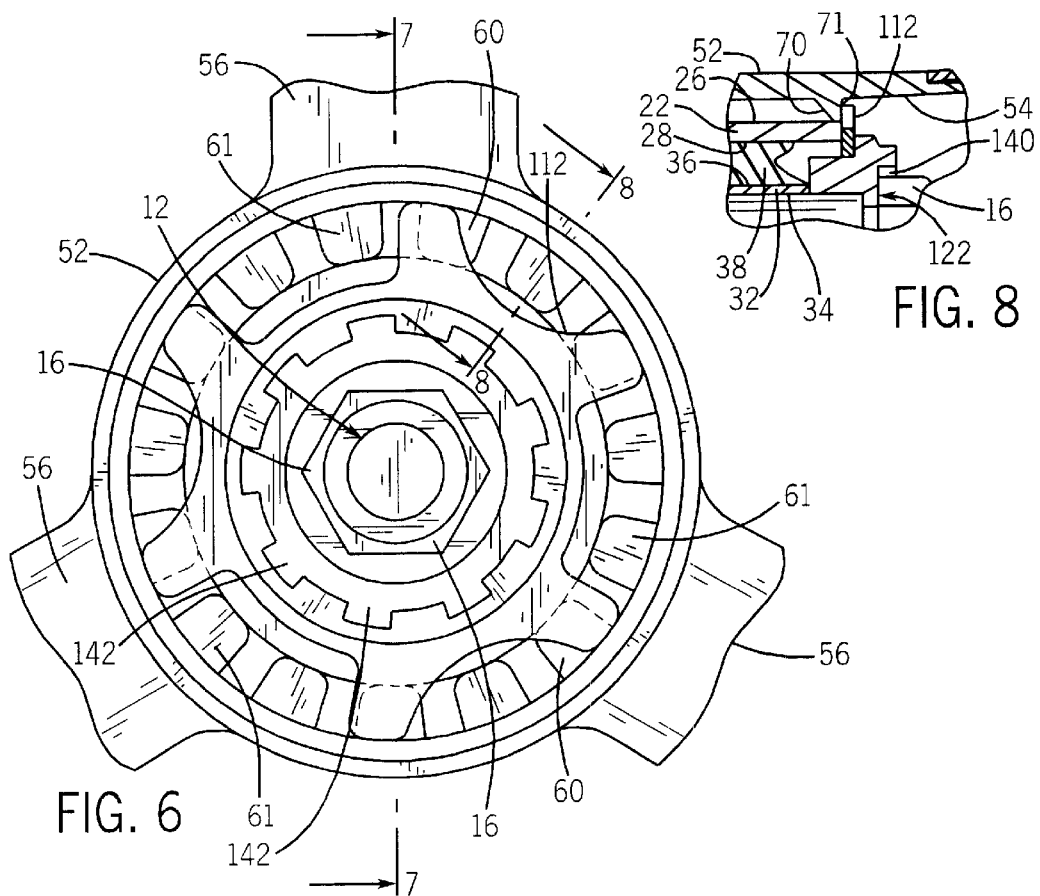
FIG. 6
FIG. 8
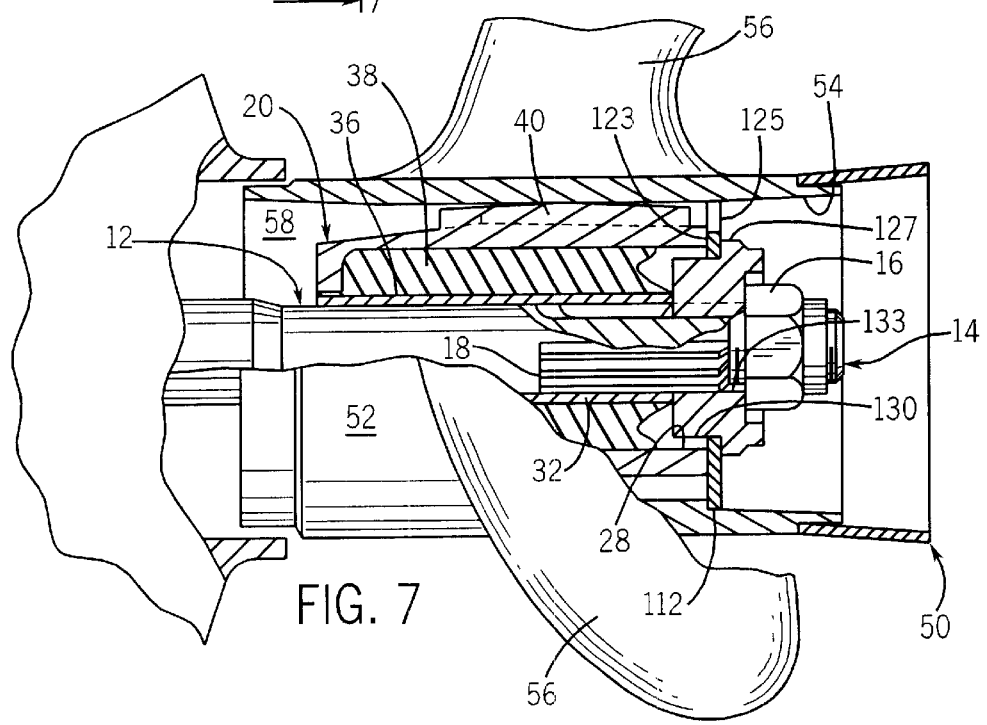
FIG. 7

PROPELLER ASSEMBLY INCORPORATING IMPROVED LOCKING STRUCTURE

RELATED APPLICATION

This application is a continuation-in-part of Ser. No. 09/612,441, filed Jul. 7, 2000 and entitled "Propeller Assembly for a Marine Vehicle."

FIELD OF THE INVENTION

This invention relates to propeller assemblies, and in particular, to a propeller assembly for a marine vehicle which incorporates an improved locking structure for maintaining the propeller assembly on the drive shaft of the marine vehicle.

BACKGROUND AND SUMMARY OF THE INVENTION

It is known to propel a marine vehicle utilizing a propeller assembly mounted on a rotatable drive shaft. The propeller assembly includes propeller blades extending radially from a central hub. A motor rotates the drive shaft which, in turn, rotates the propeller blades propelling the marine vehicle through the water.

Typically, the propeller assembly is constructed as a unit wherein the propeller blades and the central hub are mounted or removed from the drive shaft in unison. Alternatively, in order to reduce the time and costs associated with replacing the propeller blades, it has been contemplated to provide a propeller assembly for a marine engine wherein the propeller blades project from a propeller housing that is removable from a central hub. For example, LoBosco et al, U.S. Pat. No. 5,252,028 discloses a marine propeller assembly having a propeller housing which is slidably receivable on a central hub in order to be rotated therewith. The central hub is mounted on the propeller shaft and a retaining disc is threaded onto the propeller shaft to retain the propeller housing on the central hub. It has been determined, however, that the retainer disc does not adequately retain the propeller housing on the central hub such that the propeller housing may become inadvertently disengaged from the central hub resulting in the propeller housing falling from the propeller shaft during use.

Chen, U.S. Pat. No. 5,967,751 also discloses a marine propeller assembly. The propeller assembly includes a central hub secured to the propeller shaft and having three or more axially extending keys on the outer surface thereof. A propeller housing includes an inner surface having three or more pairs of lobes for forming keyways which receive the keys of the central hub. A retainer disc is threaded on a propeller shaft and includes a plurality of angularly spaced ears for engaging with the lobes on the inner surface on the propeller housing in order to prevent the propeller housing from being disengaged from the central hub.

As described, the propeller assembly disclosed in the Chen '751 patent overcomes the limitations of the structure disclosed in the LoBosco et al '028 patent. However, it has been found that the keys extending from the central hub have a tendency to become stuck within the corresponding keyways along the inner surface of the propeller housing. As a result, it may be difficult for an individual to remove the propeller housing from the central hub during maintenance, replacement or the like.

Further, it is highly desirable to retain the propeller housing on the central hub in such a manner as to prevent any unnecessary movement of the propeller housing which may reduce the efficiency of the propeller assembly. The structure disclosed in the Chen '751 patent includes a retainer disc having a plurality of angularly spaced ears which engage lobes and stops on the inner surface of the propeller housing in order to prevent the propeller housing from becoming disengaged from the central hub. However, due to manufacturing constraints, the ears may not tightly engage corresponding lobes and/or stops along the inner surface of the propeller housing thereby allowing for the possible movement of the propeller housing during use. As such, it is highly desirable to provide a locking mechanism for securely retaining the propeller housing on the central hub.

Therefore, it is a primary object and feature of the present invention to provide a propeller housing which may be securely mounted to a propeller shaft of a marine vehicle.

It is still a further object and feature of the present invention to provide a propeller assembly which is simple and inexpensive to manufacture.

It is still a further object and feature of the present invention to provide a propeller assembly which incorporates a propeller housing which may be simply and easily mounted on a central hub which, in turn, is retained on a propeller shaft of a marine vehicle.

In accordance with the present invention, a propeller assembly is provided for mounting on a rotatable propeller shaft of a watercraft. The propeller shaft extends along an axis and terminates at a threaded end. The propeller assembly includes a central hub mountable on the propeller shaft for rotational movement therewith. The central hub defines a generally cylindrical outer surface having a plurality of circumferentially spaced keys therealong. Each key has a first narrow end and a second wider end. A generally tubular propeller housing is slidable onto the central hub for rotational movement with the propeller shaft. The propeller housing includes an inner surface having a plurality of circumferentially spaced pairs of axially extending lobes therealong. Each pair of lobes defines a corresponding keyway for receiving a corresponding key along the central hub. A locking structure is mountable on the propeller shaft. The locking structure includes a spider washer having first and second ends and aperture therebetween for receiving the propeller shaft therethrough. The spider washer includes a nose portion extending from the first end thereof. A locking washer has an opening for receiving the nose portion of the spider washer therethrough and an outer periphery engaging the lobes and preventing removal of the propeller housing from the central hub. A locking element is mountable on the threaded end of the propeller shaft for retaining the spider washer on the propeller shaft.

It is contemplated to provide a stop member on the outer end of one of the keys. The stop member limits movement of the propeller housing onto the central hub. The inner surface of the propeller housing includes a shoulder formed therein. The outer periphery of the locking washer engages the shoulder to prevent removal of the propeller housing from the central hub. The outer periphery of the locking washer may include a plurality of circumferentially spaced ears.

Each key has a first narrow end and a second wider end, and each keyway of the propeller housing includes a first wide end and second narrow end. The wide end of each keyway receives the narrow end of a corresponding key of the central hub as the propeller housing is slid onto the central hub. As is conventional, the propeller housing includes an outer surface having a plurality of circumferentially spaced propeller blades extending therefrom.

In accordance with a further aspect of the present invention, a propeller assembly is provided for mounting on a rotatable propeller shaft of a watercraft. The propeller assembly includes a central hub mountable on the propeller shaft for rotational movement therewith. The central hub defines a generally cylindrical outer surface having a plurality of circumferentially spaced keys therealong. Each key has a first narrow end and a second wider outer end. A generally tubular propeller housing is slidable onto the central hub for rotational movement on the propeller shaft. The propeller shaft includes an inner surface having a plurality of circumferentially spaced pairs of axially extending lobes therealong. Each pair of lobes defines a corresponding keyway for receiving a corresponding key along the central hub. A locking structure is mountable on the propeller shaft. The locking structure includes a spider washer having a first end directed towards the central hub, a second end and an aperture therebetween for receiving a propeller shaft therethrough. The spider washer includes a nose portion extending from the first end thereof. A locking washer has an inner edge defining an opening for receiving the nose portion of the spider washer therethrough and an outer periphery for engaging the lobes and preventing removal of the propeller housing from the central hub.

The inner surface of the propeller housing may also include a ledge formed therein. The outer periphery of the locking washer includes a plurality of circumferentially spaced ears which engage the ledge and prevent removal of the propeller housing from the central hub. A locking element is mountable on the propeller shaft for retaining the locking structure thereon.

The first end of each key is narrower than the second end of each key. In addition, each keyway of the propeller housing includes a first wide end and a second narrow end such that the wide end of each keyway receives the narrow end of the corresponding key of the central hub as the propeller housing is axially slid on the central hub. As is conventional, the propeller housing includes an outer surface and a plurality of circumferentially spaced propeller blades extending therefrom.

In accordance with a still further aspect of the present invention, a propeller assembly is provided for mounting on a rotatable propeller shaft of a watercraft. The propeller shaft extends along an axis and terminates at a threaded end. The propeller assembly includes a central hub mounted on the propeller shaft for rotational movement therewith. A generally tubular propeller housing is slideable onto the central hub for rotational movement with the central hub. The propeller housing includes an inner surface having a shoulder formed therein. A locking structure is mountable on the propeller shaft. The locking structure includes a spider washer having a first end directed towards the central hub, a second end and an aperture therebetween for receiving the propeller shaft therethrough. The spider washer includes a nose portion extending from the first end thereof. A locking washer has an inner edge which defines an opening for receiving the nose portion of the spider washer therethrough and an outer periphery for engaging the shoulder and preventing removal of the propeller housing from the central hub.

The central hub defines a generally cylindrical outer surface having a plurality of circumferentially spaced keys therealong. Each key has a first narrow end and a second wider outer end. The inner surface of the propeller housing includes a plurality of circumferentially spaced pairs of axially extending lobes therealong. Each pair of lobes defines a corresponding keyway for receiving a corresponding key along the central hub. Each keyway of the propeller housing includes a first wide end and second narrow end such that the wide end of each keyway receives the narrow end of a corresponding key of the central hub as the propeller housing is axially slid onto the central hub. A stop member is mounted to the outer end of one of the keys. The stop member limits movement of the propeller housing onto the central hub. A locking element is mountable on the threaded end of the propeller shaft for retaining the locking structure on the propeller shaft. It is contemplated that the outer periphery of the locking washer includes a plurality of circumferentially spaced ears.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings:

FIG. 2 is an end view, with portions broken away, showing the propeller assembly of FIG. 1;

FIG. 3 is a cross-sectional view taken of the propeller assembly of the present invention taken along line 3—3 of FIG. 2;

FIG. 4 is a cross-sectional view of a portion of the propeller assembly of the present invention taken along line 4—4 of FIG. 3;

FIG. 6 is an end view, with portions broken away, showing the propeller assembly of FIG. 5;

FIG. 7 is a cross-sectional view of the propeller assembly of the present invention taken along line 7—7 of FIG. 6; and FIG. 8 is a cross sectional view of a portion of the propeller assembly of the present invention taken along line 8—8 of FIG. 6.

DETAILED DESCRIPTION OF THE DRAWINGS

Figure 1:
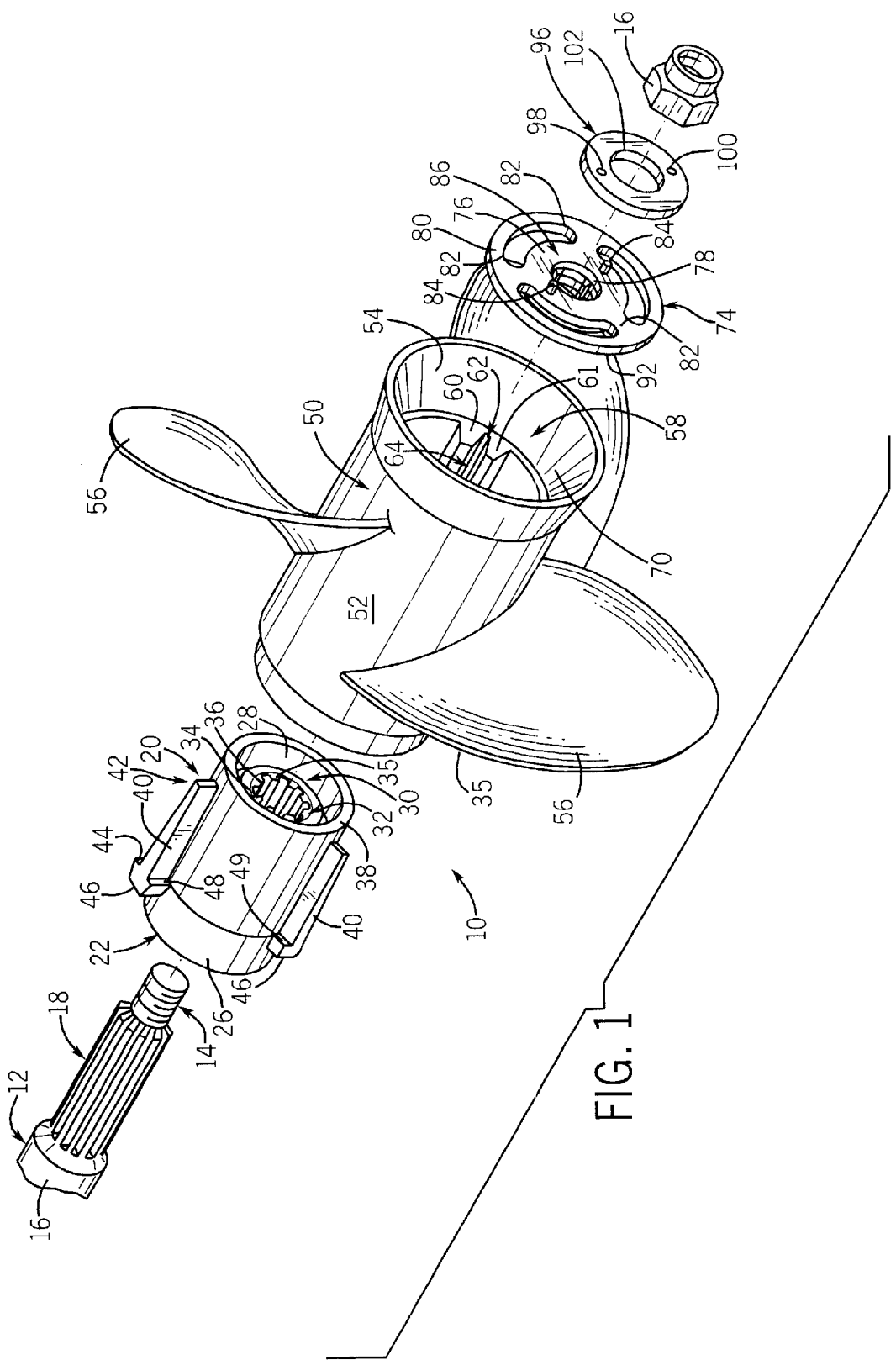
FIG. 1 is an exploded, isometric view of a propeller assembly in accordance with the present invention.

Referring to FIG. 1, a propeller assembly in accordance with the present invention is generally designated by the reference numeral 10. It is intended that propeller assembly 10 be mounted on a rotatable propeller shaft 12 which, in turn, is driven by a marine engine (not shown). Propeller shaft 12 extends along a longitudinal axis and terminates at threaded terminal end 14 adapted for receiving locking nut 16 thereon, for reasons hereinafter described. As is conventional, rotatable shaft 12 includes an outer surface 16 having longitudinally extending splines 18 therealong adjacent terminal end 14.

Referring to FIGS. 1 and 3, propeller assembly 10 includes a central hub 20 formed from an outer shell 22 and a coupling tube 32. Outer shell 22 includes an outer surface 26 and an inner surface 28 which defines a cavity 30 therein. Coupling tube 32 is positioned within cavity 30 defined by inner surface 28 of central hub 20. Coupling tube 32 includes an inner surface 34 having longitudinally extending splines 35 extending therealong which mesh with splines 18 extending along propeller shaft 12 and an outer surface 36. A resilient bushing 38 is disposed between outer surface 36 of connector tube 32 and inner surface 28 of outer shell 22 in order to translate rotational movement of connector tube 32 to outer shell 22.

Outer shell 22 of central hub 20 further includes a plurality of circumferentially spaced, axially extending keys 40. Each key includes a narrow outer end 42 and a wider inner end 44. Stop members 46 are positioned adjacent corresponding inner ends 44 of keys 40 transverse thereto. Each stop member 46 includes first and second stop surfaces 48 and 49, for reasons hereinafter described.

Propeller assembly 10 further includes a propeller housing 50 having an outer surface 52 and an inner surface 54. A plurality of propeller blades 56 project radially from outer surface 52. Inner surface 54 defines a central hub receiving cavity 58 within propeller housing 50. Inner surface 54 of propeller housing 50 includes a plurality of pairs of lobes 60 and 61 which define keyways 62 therebetween for receiving corresponding keys 40 extending along outer surface 26 of outer shell 22 of central hub 20. As best seen in FIGS. 3—4, lobes 60 and 61 include first inner ends 63 and 65 and second outer ends 67 and 69, respectively, for engaging corresponding stop surfaces 48 and 49, respectively, of stop member 46. Each keyway 62 includes a narrow outer end 64 for engaging a narrow outer end 42 of a corresponding key 40 and a wider inner end 66 for engaging the wider inner end 44 of a corresponding key 40. Inner surface 54 of propeller housing 50 further includes a generally circular shoulder 70 formed therein, for reasons hereinafter described. Shoulder 70 defines an outer rim engaging surface 71 which is generally co-planar with outer ends 67 and 69 of lobes 60 and 61, respectively. Outer rim engaging surface 71 defines a circle of predetermined outer and inner diameters.

A locking ring 74 is provided for maintaining the propeller housing 50 on central hub 20. Locking ring 74 includes a generally circular central portion 76 having an aperture 78 therein for allowing terminal end 14 of propeller shaft 12 to pass therethrough. Locking ring 74 further includes a generally circular outer rim 80 interconnected to central portion 76 by a plurality of spokes 82. Outer rim 80 has an outer diameter which is greater than the inner diameter of outer rim engaging surface 71 and which is less than the outer diameter of outer rim engaging surface 71.

It is contemplated to provide alignment pins 84 on a first side 86 of locking ring 74 and to provide washers 88 and 90 on a second side 92 of locking ring 74. As best seen in FIG. 3, washers 88 and 90 include apertures 88a and 90a, respectively, therein for allowing terminal end 14 of propeller shaft 12 to pass therethrough. Washers 88 and 90 are sized to be receivable within cavity 30 defined by inner surface 28 of outer shell 22 in a manner hereinafter described. A washer 96 is supported on alignment pins 84 projecting from side 86 of locking ring 74. Washer 96 includes first and second pin apertures 98 and 100, respectively, for receiving corresponding alignment pins 84 projecting from locking ring 74. Washer 96 further includes an aperture 102 for allowing terminal end 14 of propeller shaft 12 to pass therethrough.

In order to assembly propeller assembly 10 on propeller shaft 12, central hub 20 is slid axially onto propeller shaft 12 such that splines 35 extending along the inner surface 34 of coupling tube 32 mesh with splines 18 extending along propeller shaft 12. Thereafter, propeller housing 50 is slid axially onto central hub 20 such that keys 40 extending along outer surface 26 of outer shell 22 of central hub 20 are received within corresponding keyways 62. Initially, outer ends 42 of corresponding keys 40 are received within wider inner ends 64 of keyways 62. Propeller housing 50 is slid onto central hub 30 until such point that stop member engaging surfaces 63a and 65a of corresponding lobes 60 and 61, respectively, engage corresponding stop surfaces 48 and 49 of stop members 46. As described, stop members 46 prevent keys 40 from becoming wedged within corresponding keyways 62.

Locking ring 74 is positioned on propeller shaft 12 such that terminal end 14 of propeller shaft 12 extending through aperture 78 in central portion 76 of locking ring 74. Outer rim 80 of locking ring 74 engages outer rim engaging surface 71 along the inner surface 54 of propeller housing 50. Washers 88 and 90 are received within cavity 30 defined by inner surface 28 of outer shell 22 so as to fill the axial space within cavity 30 between end 32a of coupling tube 32 and side 92 of locking ring 74. Washer 96 is positioned on terminal end 14 of propeller shaft 12 such that first and second pin apertures 98 and 100, respectively, receive corresponding alignmnent pins 84 projecting from side 86 of locking ring 74, and such that terminal end 14 of propeller shaft 12 passes through aperture 102 in washer 96. Locking nut 16 is threaded onto terminal end 14 of propeller shaft 12 to secure propeller assembly on propeller shaft 12.

As described, propeller assembly 10 is secured on propeller shaft 12. If it is desired to replace propeller blades 56 in order for maintenance purposes or simply because circumstances dictate use of propeller blades with different pitch or the like, locking nut 16 is simply removed from terminal end 14 of propeller shaft 12 so as to allow washer 96, locking ring 74 and propeller housing 50 to be axially slid from central hub 20. Thereafter, a new or replacement propeller housing 50 may be mounted on central hub 20, as heretofore described. As a result, propeller blades may be replaced without replacing central hub 20 provided therewith. Consequently, propeller assembly 10 of the present invention reduces the time and the costs associated with the replacement of propeller blades.

Figure 5:
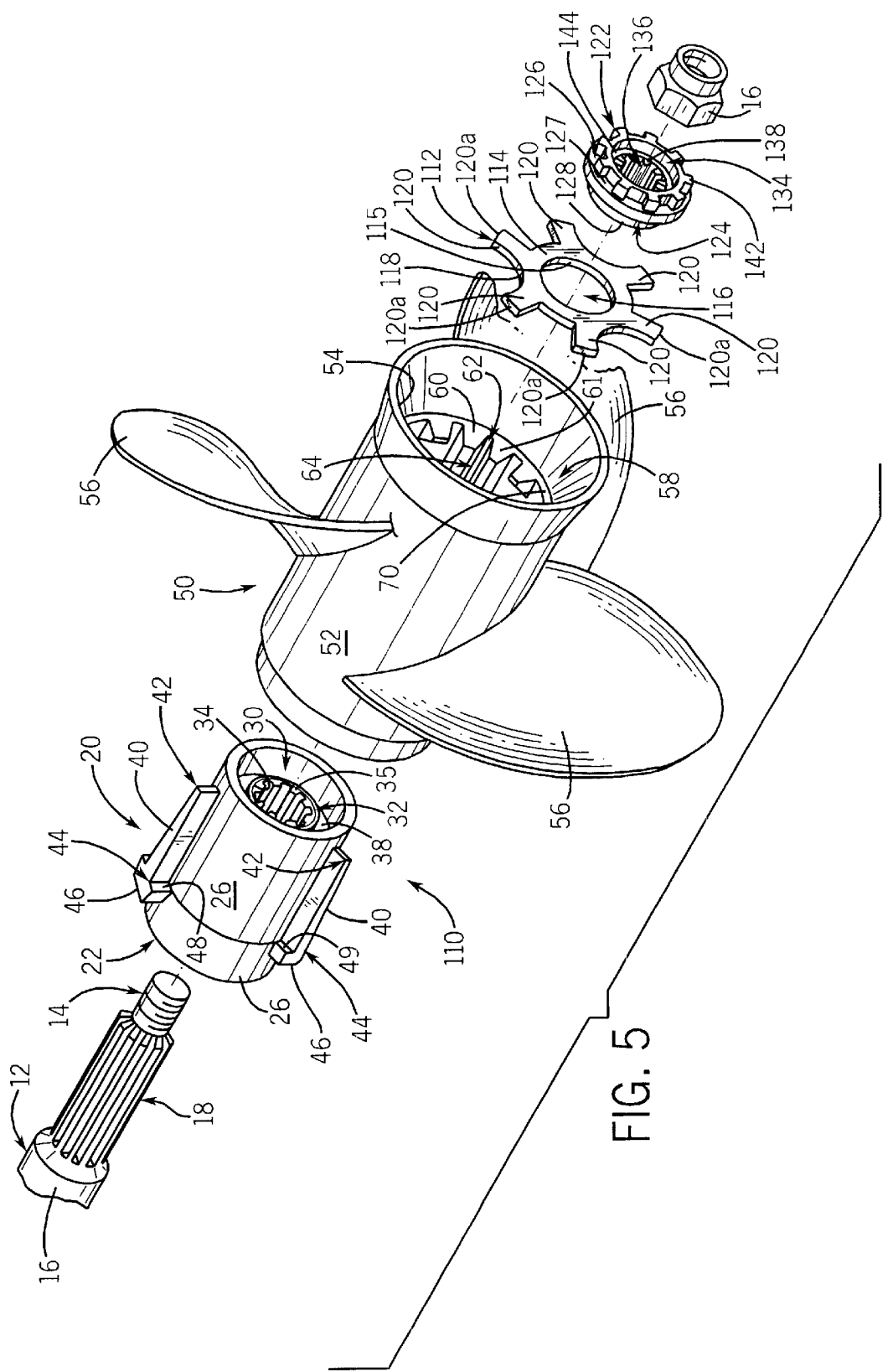
FIG. 5 is an exploded, isometric view of a second embodiment of a propeller assembly in accordance with the present invention.

Referring to FIG. 5, an alternate propeller assembly in accordance with the present invention is generally designated by the reference numeral 110. It is intended that propeller assembly 110 be mounted on rotatable propeller shaft 12 which, in turn, is driven by a marine engine (not shown). Propeller assembly 110 includes central hub 20 and propeller housing 50 as heretofore described. As such, the previous description of central hub 20 and propeller housing 50 of propeller assembly 10 is understood to describe central hub 20 and propeller housing 50 of propeller assembly 110 as if fully described herein.

Locking washer 112 is provided for maintaining propeller housing 50 on central hub 20. Locking washer 112 includes a generally flat circular portion 114 having an inner edge 115 defining an aperture 116 therethrough for reasons hereinafter described. Circular portion 114 further includes an outer periphery 118 having a plurality of circumferentially spaced ears 120 projecting radially therefrom. First side 123 of locking washer 112 is directed towards the central hub 20 and second side 125 of locking washer 112 is directed towards spider washer 122.

Spider washer 122 includes central portion 127 having a first inner end 124 directed towards the interior of propeller housing 50 and a second outer end 126. Central portion 127 of spider washer 122 has a diameter greater than the diameter of aperture 116 through locking washer 112. A generally cylindrical nose portion 128 extends from inner end 124 of central portion 127 of spider washer 122 and has a diameter less than the diameter of aperture 116 through locking washer 112 such that nose portion 128 may be inserted through aperture 116 in locking washer 112. The intersection of central portion 127 of spider washer 122 and nose portion 128 of spider washer 122 defines a shoulder 130.

Spider washer 122 further includes an inner surface 133 defining a passageway 134 therethrough. Passageway 134 includes a splined portion 136 wherein longitudinally extending splines 138 extend along inner surface 133 of spider washer 122. As hereinafter described, splines 138 are adapted to mesh with splines 18 extending along outer surface 16 of rotatable shaft 12. Passageway 134 further includes an enlarged portion 140 having a diameter greater than the diameter of splined portion 136 and of sufficient dimension to receive locking nut 16 therein.

A plurality of circumferentially spaced tabs 142 extend from outer end 126 of central portion 127 of spider washer 122. Tabs 142 are adapted for receiving a tab washer (not shown) which may be provided by selected OEM manufacturers of marine drive equipment in order to maintain propeller assembly 110 on drive shaft 12.

In order to assemble propeller assembly 110 on propeller shaft 12, central hub 20 is slid axially onto propeller shaft 12 as heretofore described. Thereafter, propeller housing 50 is slid axially onto central hub 20 such that keys 40 extending along the outer surface 26 of outer shell 22 of central hub 20 are received within corresponding keyway 62 until such point that stop member engaging surfaces 63a and 65a of corresponding lobes 60 and 61, respectively, engage corresponding stop surfaces 48 and 59 of stop members 46. Locking washer 112 is positioned about propeller shaft 12 such that at least one of the ears 120 extending from the outer periphery 118 of circular portion 114 overlaps a corresponding lobe 60 and 61 extending along the inner surface 54 of propeller housing 50. In a preferred embodiment, terminal ends 120a of ears 120 overlap outer rim engaging surface 71 of shoulder 50 formed in inner surface 54 of propeller housing 50.

Spider washer 122 is positioned on propeller shaft 12 such that terminal end 14 of propeller shaft 12 extends through passageway 134 through spider washer 122 and such that nose portion 128 of spider washer 122 extends through aperture 116 of locking washer 112 into cavity 30 within outer shell 22 of central hub 20. Splines 138 along the splined portion 136 of passageway 134 through spider washer 122 mesh with splines 18 extending along the outer surface 16 of drive shaft 12. Locking nut 16 is threaded onto terminal end 14 of propeller shaft 12 to secure propeller assembly 110 on propeller shaft 12. Locking nut 16 engages shoulder 144 formed along the inner surface 133 of spider washer 122 such that locking washer 112 is captured between outer rim engaging surface 71 along the inner surface 54 of propeller housing 50 and shoulder 130 formed at the intersection of nose portion 128 and central portion 127 of spider washer 122.

As described, ears 120 of locking washer 122 also overlap one or more lobes 60 and 61 along inner surface 54 of propeller housing 50 so as to prevent propeller housing 50 from sliding axially off central hub 20. In addition, locking washer 112 is maintained against outer rim engaging surface 71 along the inner surface 54 of propeller housing 50 during rotation of propeller shaft 12.

As heretofore described, if it is desired to replace propeller blades 56 in order for maintenance purposes or simply because circumstances dictate use of propeller blades with different pitch or the like, locking nut 16 may be simply removed from terminal end 14 of propeller shaft 12 so as to allow spider washer 122 and locking washer 112 to be axially slid from propeller shaft 12. Propeller housing 50 may be removed from central hub 20 and a new or replacement propeller housing 50 may be mounted on central hub 20, as heretofore described.

Various modes of carrying out the invention are contemplated as being within the scope of the following claims particularly pointing out and distinctly claiming the subject matter which is regarded as the invention.

What is claimed is:

1. A propeller assembly for mounting on a rotatable propeller shaft of a watercraft, the propeller shaft extending along an axis and terminating at a threaded end, comprising:

a central hub mountable on the propeller shaft for rotational movement therewith, the central hub defining a generally cylindrical outer surface having a plurality of circumferentially spaced keys therealong, each key having a first, narrow end and a second, wider outer end;

a generally tubular propeller housing slidable onto the central hub for rotational movement with the propeller shaft, the propeller housing including an inner surface having a plurality of circumferentially spaced pairs of axially extending lobes therealong, each pair of lobes defining a corresponding keyway for receiving a corresponding key along the central hub; and a locking structure mountable on the propeller shaft, the locking structure including:

a spider washer having first and second ends and an aperture therebetween for receiving the propeller shaft therethrough, the spider washer including a nose portion extending from the first end thereof;

a locking washer having an opening for receiving the nose portion of the spider washer therethrough and an outer periphery for engaging the lobes and preventing removal of the propeller housing from the central hub; and a locking element mountable on the threaded end of the propeller shaft for retaining the spider washer on the propeller shaft.

2. The propeller assembly of claim 1 further comprising a stop member mounted to the outer end of the keys, the stop member limiting movement of the propeller housing onto the central hub.

3. The propeller assembly of claim 1 wherein the inner surface of the propeller housing includes a ledge therein, the outer periphery of the locking washer engaging the ledge for preventing removal of the propeller housing from the central hub.

4. The propeller assembly of claim 1 wherein each key having a first narrow end and a second, wider end and each keyway of the propeller housing includes a first wide end and a second narrow end such that the wide end of the each keyway receives the narrow end of a corresponding key of the central hub as the propeller housing is axially slid onto the central hub.

5. The propeller assembly of claim 1 wherein the propeller housing includes an outer surface and a plurality of circumferentially spaced propeller blades extending therefrom.

6. The propeller assembly of claim 1 wherein the outer periphery of the locking washer includes a plurality of circumferentially spaced ears.

7. A propeller assembly for mounting on a rotatable shaft of a watercraft, the shaft extending along an axis and terminating at a threaded end, comprising:

a central hub mountable on the propeller shaft for rotational movement therewith, the central hub defining a generally cylindrical outer surface having a plurality of circumferentially spaced keys therealong, each key having a first inner end and a second outer end;

a generally tubular propeller housing slidable onto the central hub for rotational movement with the propeller shaft, the propeller housing including an inner surface having a plurality of circumferentially spaced pairs of axially extending lobes therealong, each pair of lobes defining a corresponding keyway for receiving a corresponding key along the central hub; and a locking structure mountable on the propeller shaft, the locking structure including:

a spider washer having a first end directed towards the central hub, a second end and an aperture therebetween for receiving the propeller shaft therethrough, the spider washer including a nose portion extending from the first end thereof; and a locking washer having an inner edge detecting an opening for receiving the nose portion of the spider washer therethrough and an outer periphery for engaging the lobes and preventing removal of the propeller housing from the central hub.

8. The propeller assembly of claim 7 wherein the inner surface of the propeller housing includes a ledge therein.

9. The propeller assembly of claim 8 wherein the outer periphery of the locking washer includes a plurality of circumferentially spaced ears for engaging the ledge and preventing removal of the propeller housing from the central hub.

10. The propeller assembly of claim 9 further comprising a locking element mountable on the propeller shaft for retaining the locking structure on the propeller shaft.

11. The propeller assembly of claim 7 wherein the first end of each key is narrower than the second end of each key and wherein each keyway of the propeller housing includes a first wide end and a second narrow end such that the wide end of each keyway receives the narrow end of a corresponding key of the central hub as the propeller housing is axially slid onto the central hub.

12. The propeller assembly of claim 7 wherein the propeller housing includes an outer surface and a plurality of circumferentially spaced propeller blades extending therefrom.

13. A propeller assembly for mounting on a rotatable propeller shaft of a watercraft, the propeller shaft extending along an axis and terminating at a threaded end, comprising:

a central hub mounted on the propeller shaft for rotational movement therewith;

a generally tubular propeller housing slidable onto the central hub for rotational movement with the propeller shaft, the propeller housing including an inner surface having a shoulder formed therein; and a locking structure mountable on the propeller shaft, the locking structure including:

a spider washer having a first end directed towards the central hub, a second end and an aperture for receiving the propeller shaft therethrough, the spider washer including a nose portion of reduced diameter adjacent the first end thereof; and a locking washer having an opening for receiving the nose portion of the spider washer therethrough and an outer periphery for engaging the shoulder and preventing removal of the propeller housing from the central hub.

14. The propeller assembly of claim 13 wherein the central hub defines a generally cylindrical outer surface having a plurality of circumferentially spaced keys therealong, each key having a first, narrow end and a second, wider outer end and wherein the inner surface of the propeller housing includes a plurality of circumferentially spaced pairs of axially extending lobes therealong, each pair of lobes defining a corresponding keyway for receiving a corresponding key along the central hub.

15. The propeller assembly of claim 14 wherein each keyway of the propeller housing includes a first wide end and a second narrow end such that the wide end of the each keyway receives the narrow end of a corresponding key of the central hub as the propeller housing is axially slid onto the central hub.

16. The propeller assembly of claim 14 further comprising a stop member mounted to the outer end of one of the keys, the stop member limiting movement of the propeller housing onto the central hub.

17. The propeller assembly of claim 13 further comprising a locking element mountable on the threaded end of the propeller shaft for retaining the locking structure on the propeller shaft.

18. The propeller assembly of claim 13 wherein the outer periphery of the locking washer includes a plurality of circumferentially spaced ears.

* * * * *